(12) United States Patent
Shimizu

(10) Patent No.: US 6,862,039 B2
(45) Date of Patent: Mar. 1, 2005

(54) ELECTRONIC CAMERA INCLUDING COLOR TONE ADJUSTMENT OF A REAL-TIME IMAGE

(75) Inventor: Eiichi Shimizu, Yokohama (JP)

(73) Assignee: Eastman Kodak Company, Rochester, NY (US)

( * ) Notice: Subject to any disclaimer, the term of this patent is extended or adjusted under 35 U.S.C. 154(b) by 762 days.

(21) Appl. No.: 09/810,788

(22) Filed: Mar. 16, 2001

(65) Prior Publication Data

US 2004/0227823 A1 Nov. 18, 2004

(30) Foreign Application Priority Data

Aug. 31, 2000 (JP) ........................................ 2000-262084

(51) Int. Cl.[7] .............................................. H04N 9/73
(52) U.S. Cl. ................................ 348/223.1; 348/333.11
(58) Field of Search ......................... 348/207.99, 220.1, 348/222.1, 223.1, 225.1, 229.1, 256, 64.9, 655, 656, 333.1, 333.11, 333.12; 386/120

(56) References Cited

U.S. PATENT DOCUMENTS

| | | | | |
|---|---|---|---|---|
| 5,068,718 A | * | 11/1991 | Iwabe et al. ................. 348/675 |
| 5,504,524 A | * | 4/1996 | Lu et al. .................. 348/223.1 |
| 5,633,976 A | * | 5/1997 | Ogino ........................ 386/120 |
| 2003/0164890 A1 | * | 9/2003 | Ejima et al. ............. 348/333.1 |
| 2003/0218677 A1 | * | 11/2003 | Nishimura ............... 348/223.1 |

* cited by examiner

Primary Examiner—Tuan Ho
(74) Attorney, Agent, or Firm—Pamela R. Crocker

(57) ABSTRACT

To select a color tone adjusting mode in an electronic camera, a guide for adjusting the color tone is shown on a monitor (S100), an operation signal from direction buttons is read (S102), and it is judged from the read operation signal whether the direction buttons are operated (S104). When it is judged that the direction buttons are operated, an adjustment value of the color tone corresponding to the operated button is calculated to instruct the correction of the color tone (S106, S108). A decision signal is read (S110), and processes of adjusting the color tone (S102 to S112) are repeated until it is judged that the operation has been terminated. Thus, operability of the electronic camera to adjust the color tone can be improved furthermore.

3 Claims, 3 Drawing Sheets

ELECTRONIC CAMERA INCLUDING COLOR TONE ADJUSTMENT OF A REAL-TIME IMAGE

FIELD OF THE INVENTION

The present invention relates to an electronic camera, and more particularly to an electronic camera provided with a display device for displaying a photoelectric-converted image.

BACKGROUND OF THE INVENTION

Proposed for conventional electronic cameras of the type described above is a white balance adjusting capability enabling the camera to capture images with a natural color tone under changing light source characteristics (a type of luminescence tube, a luminescence method, a color tone, etc.). Known types of adjustment providing white balance adjusting capability include auto white balance in which white balance is adjusted automatically, preset white balance in which a user pre-selects a light source type, one-push white balance in which only a specified area is adjusted, and manual white balance in which white balance is adjusted arbitrarily.

However, in the electronic cameras as described above, the white balance must still be corrected after an image is captured when the white balance adjustment was insufficient. Particularly when photography is conducted on the basis of the setting of the manual white balance, there is a drawback that some operators must capture images many times in order to adjust the white balance by trial and error because no appropriate standard for adjusting the white balance was available.

Accordingly, it is an object of the present invention to provide an electronic camera with improved operability.

SUMMARY OF THE INVENTION

The electronic camera of the present invention adopts the following means to achieve the object described above.

The electronic camera of the present invention may be configured as an electronic camera, which is portable and has a display device for showing a photoelectric-converted image, comprising input means for entering a color tone adjustment value of a real-time image shown on the display device; adjustment means for adjusting the color tone of the real-time image according to the entered adjustment value; and correction means for correcting the real-time image according to the adjusted color tone.

In the electronic camera of the present invention, input means are provided for entering the color tone adjustment value of the real-time image shown on the display, and adjusting means are provided for adjusting the color tone of the real-time image according to the entered adjustment value. The correction means are used to correct the real-time image according to the adjusted color tone. With the electronic camera of the present invention, the operator can view the image shown in real time and adjust the color tone. Operability is therefore further improved.

The electronic camera of the present invention may have white balance adjustment means for automatically adjusting a white balance of the real-time image, and the input means may be means for entering a color tone adjustment value of the real-time image adjusted by the white balance adjustment means. Thus, the color tone can be finely adjusted on the basis of the result of the automatic adjustment of the white balance. Here, automatic adjustment includes auto white balance in which the white balance is fully automatically adjusted, and also to semiautomatic adjustments wherein a value for white balance is preset, the operator selects a type of light source, and the white balance is automatically adjusted accordingly. Automatic adjustment also refers to pre-setting and one-push white balance wherein a particular area is designated in a captured image screen and the white balance is automatically adjusted based on information about the designated area.

The electronic camera of the present invention may also include area setting means for setting at least a partial area of the real-time image shown on the display device, and the adjustment means may be means for adjusting a color tone in the area set by the area setting means. Thus, the color tone of a desired subject can be adjusted.

DESCRIPTION OF THE PREFERRED EMBODIMENT

Figure 1:
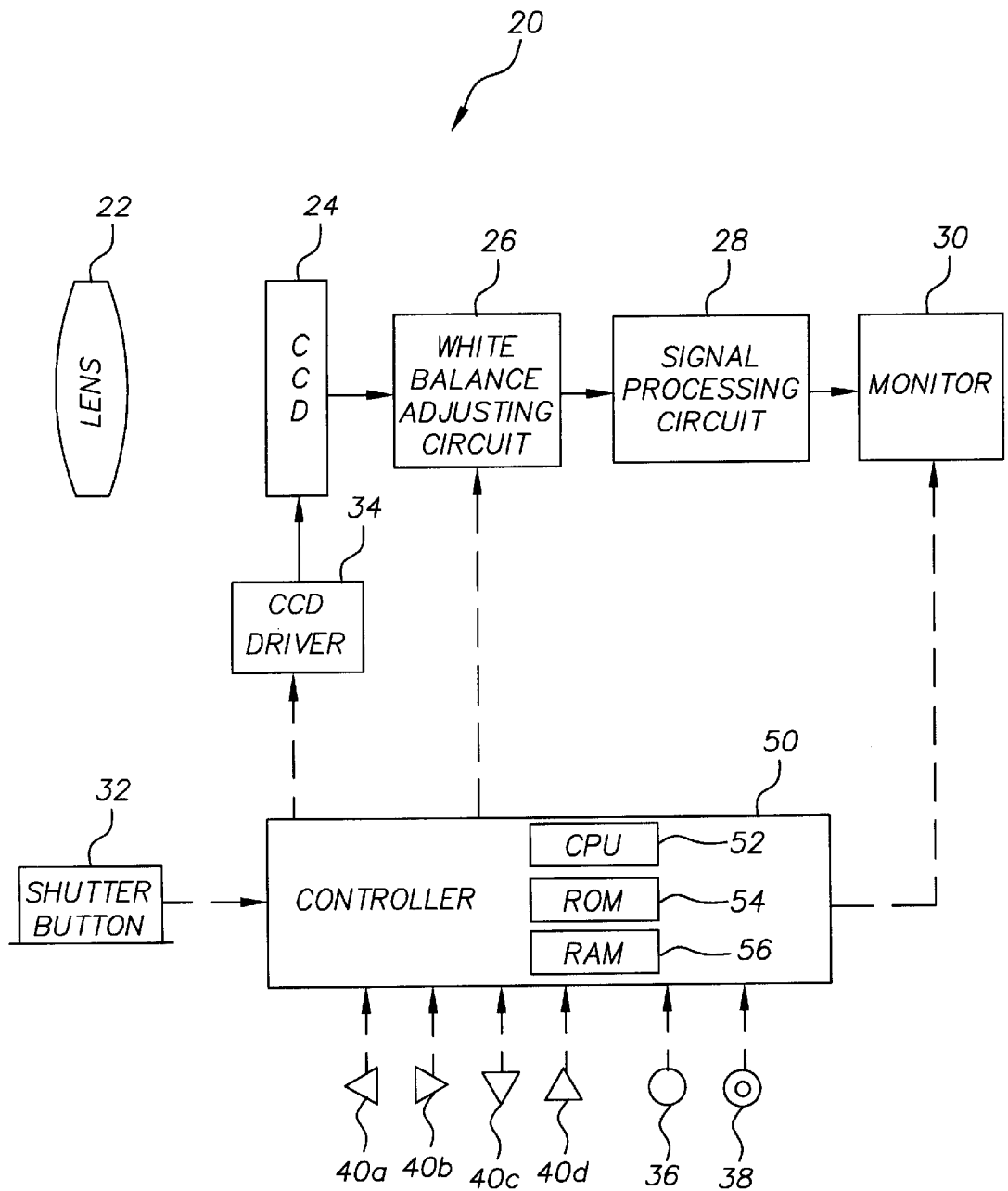
FIG. 1 is a diagram schematically showing the structure of an electronic camera 20 of an embodiment of the present invention.
Figure 2:
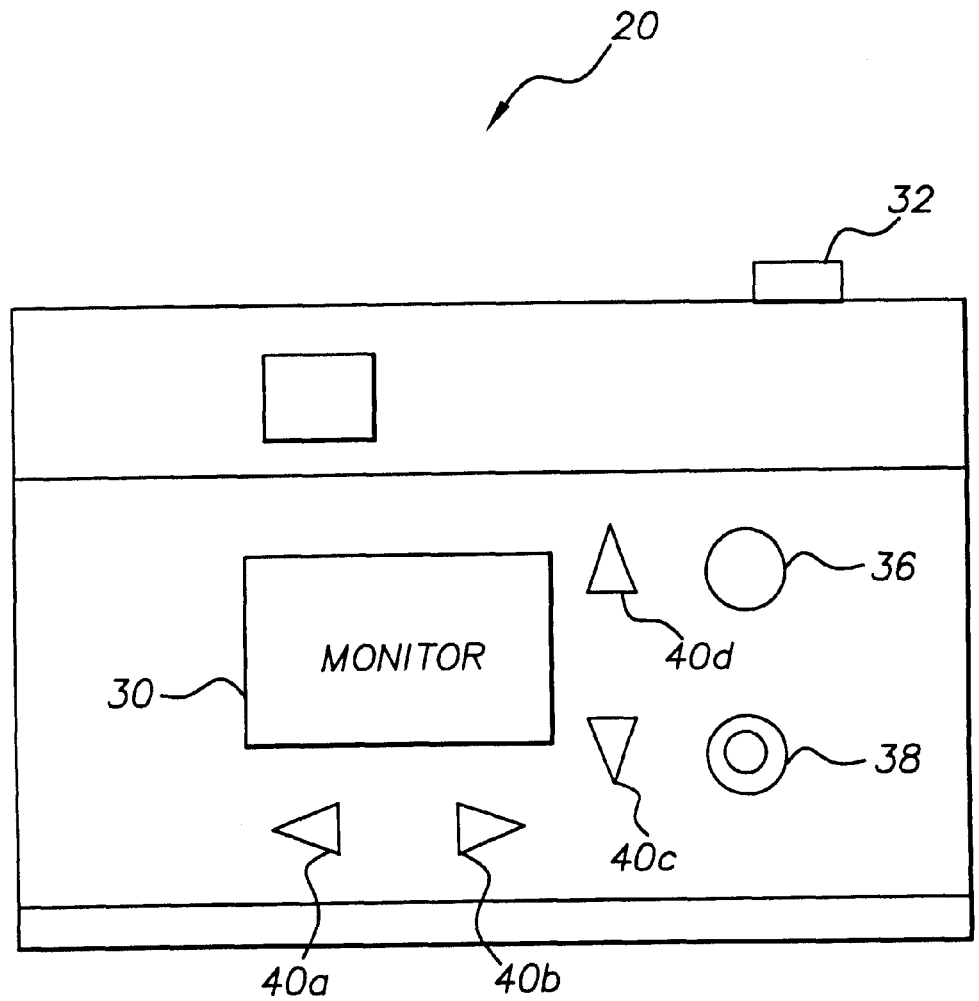
FIG. 2 is a diagram schematically showing the back of the electronic camera 20 of the embodiment of the present invention.

A preferred embodiment of the present invention will be described with reference to the drawings. FIG. 1 is a diagram schematically showing the structure of an electronic camera 20 according to the preferred embodiment of the present invention, and FIG. 2 is a diagram schematically showing the back of the electronic camera 20 of the embodiment of the present invention. The electronic camera 20 is configured so that the operator can arbitrarily adjust a color tone of a real-time image and has a lens 22 for catching a subject, a CCD 24 as a solid-state image pickup device for converting the light from the lens 22 into an electric signal, a white balance adjusting circuit 26 for adjusting the white balance of an image signal based on the converted electric signal and also adjusting the color tone, a signal processing circuit 28 for performing predetermined processing of the adjusted image signal, a monitor 30 (e.g., LCD) for outputting the processed image signal as an image, and a controller 50 for controlling the entire apparatus. As an input device for adjusting the color tone of the real-time image, the electronic camera 20 has a function selection button 36, a decision button 38, and direction buttons 40a, 40b, 40c, 40d.

The function selection button 36 is a button which can switch among adjusting modes (e.g., auto white balance, manual white balance, preset white balance, one-push white balance) of the white balance, and also switch to a color tone adjusting mode capable of adjusting the color tone of the real-time image arbitrarily. After a desired adjusting mode is selected by the function selection button 36, the decision button 38 is pushed to confirm the selected adjusting mode.

The direction buttons 40a, 40b, 40c, 40d are buttons which can adjust the color tone of the real-time image arbitrarily when the color tone adjusting mode is selected by the function selection button 36. The direction buttons 40a, 40b, 40c, 40d are allocated to respective elements configuring the image signal whose color tone is to be adjusted. In the example of the present embodiment, RGB signals forming the image signal are converted into luminance and two color-difference elements, and the direction buttons 40a, 40b (corresponding to green and purple) and the direction buttons 40c, 40d (corresponding to red and blue) are allocated to the two color-difference elements respectively. Even when the color tone is being adjusted by operating the direction buttons 40a, 40b, 40c, 40d, the adjusted value of the color tone can be returned to the default value by operating the function selection button 36. After the color tone is adjusted, the adjusted result is stored. Therefore, after the color tone is adjusted, the adjusted result is used for imaging.

The controller 50 is configured as a microprocessor mainly consisting of a CPU 52 and has a ROM 54 on which a processing program is recorded, a RAM 56 for temporarily storing data, and input and output ports (not shown). The controller 50 receives a selection signal from the function selection button 36, operation signals from the direction buttons 40a, 40b, 40c, 40d, a decision signal from the decision button 38 and a photographing start signal from a shutter button 32 through the input port and outputs a CCD drive signal to a CCD driver 34, an adjustment signal to the white balance adjusting circuit 26 and an output signal to the monitor 30 through the output port.

Figure 3:
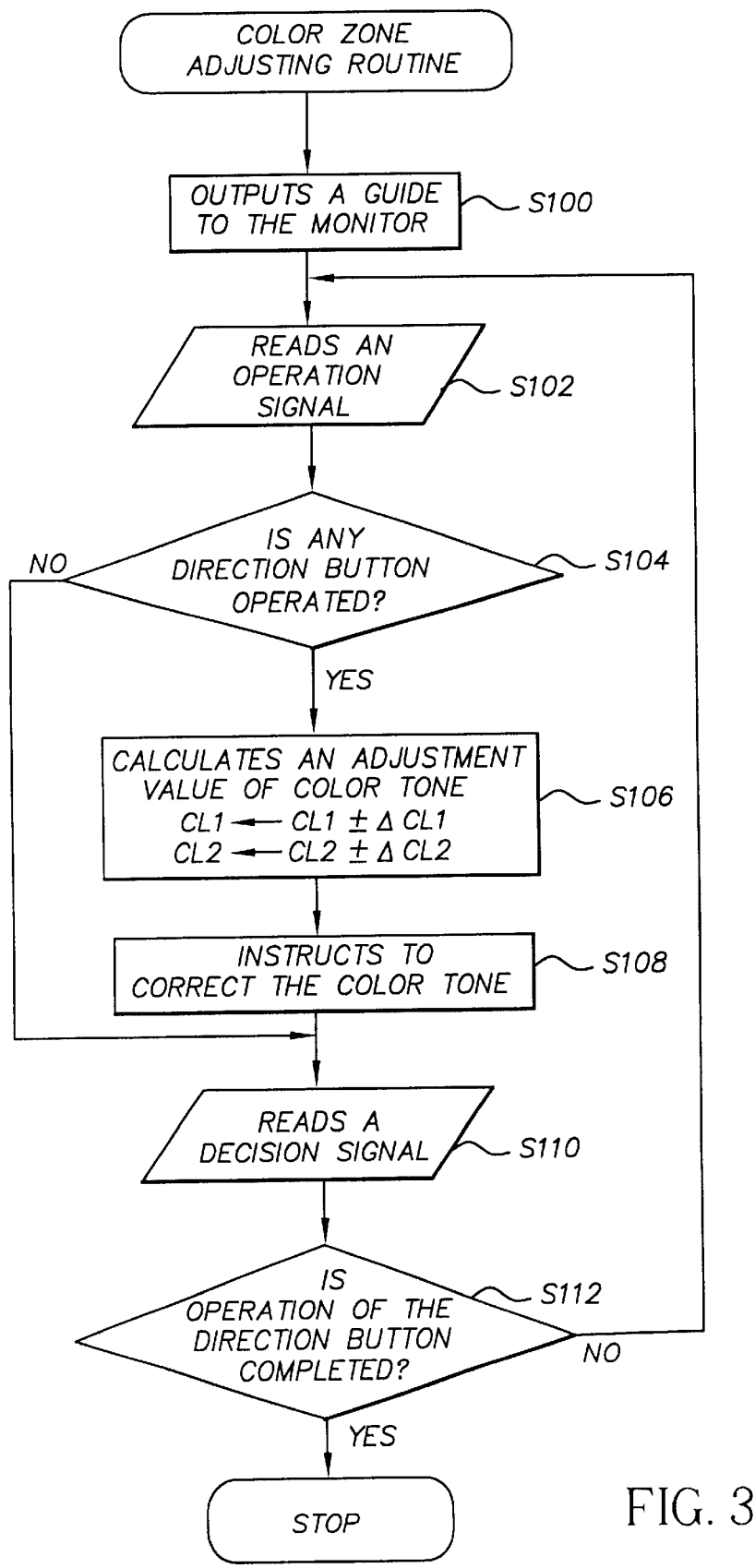
FIG. 3 is a flowchart showing an example of a color tone adjusting routine executed by a controller 50 of the electronic camera 20.

Operations of the electronic camera 20 configured as described above, and particularly those for the color tone adjustment will next be described. FIG. 3 is a flowchart showing an example of a color tone adjusting routine executed by the CPU 52 of the controller 50. This routine is executed when the real-time image is shown on the monitor 30, and the color tone adjustment mode is selected and confirmed by operating the function selection button 36 and the decision button 38.

When the color tone adjusting process routine is executed, the CPU 52 of the controller 50 first processes to output a guide for the color tone adjustment to the monitor 30 (step S100). For example, the guide is indicated on the monitor 30 by showing green, purple, red and blue corresponding to the directions of the direction buttons 40a, 40b, 40c, 40d. Then, the operation signals from the direction buttons 40a, 40b, 40c, 40d are read (step S102), and it is judged from the read operation signals which of the direction buttons 40a, 40b, 40c, 40d were operated (step S104). When it is determined that any of the direction buttons 40a, 40b, 40c, 40d have been operated, a process to calculate the adjustment value of the color tone of the real-time image is executed (step S1106). This process calculates the adjustment value by increasing or decreasing a predetermined amount of the color tone corresponding to the operated one of the direction buttons 40a, 40b, 40c, 40d every time any of them is operated. In the example of this embodiment, parameters of two color-difference signals forming the image signal are indicated by CL1, CL2 and, when a single operation of the direction buttons 40a, 40b, 40c, 40d changes each parameter of the color-difference signal by unit adjustment amounts $\Delta CL1$, $\Delta CL2$ (parameters are changed by $+\Delta CL1$, $-\Delta CL1$, $+\Delta CL2$, $-\Delta CL2\square$ when the direction buttons 40a, 40b, 40c, 40d are operated), the adjustment values of the color tone of the real-time image by the operation of the direction buttons 40a, 40b, 40c, 40d are calculated as indicated by the following expressions, where the unit adjustment amounts $\Delta CL1$, $\Delta CL2$ are determined according to the number of gradations which can be indicated as an image by the image signal.

$$CL1 \leftarrow CL1 \pm \Delta CL1$$
$$CL2 \leftarrow CL2 \pm \Delta CL2$$

Thus, when the adjustment value of the color tone of the real-time image is determined as described above, an adjustment signal according to the adjustment value is output to the white balance adjusting circuit 26 to instruct the correction of the color tone of the real-time image (step S108), and thus the color tone of the real-time image is corrected according to the adjustment value by the white balance adjusting circuit 26. The corrected result is then output to the monitor 30. Meanwhile, when it is judged in step S104 that the direction buttons 40a, 40b, 40c, 40d have not been operated, the color tone is not adjusted.

When it is determined at step S102 that none of the direction buttons 40a, 40b, 40c, 40d was operated, or when it is instructed in step S108 that the color tone shall be corrected, the decision signal from the decision button 38 is read (step S110), and it is judged whether the operation for the color tone adjustment was completed (step S112). When it is judged that the operation for the color tone adjustment has completed, it is assumed that the color tone adjustment of the real-time image by operating the direction buttons 40a, 40b, 40c, 40d has completed, and this routine is terminated. When it is judged that the operation has not completed, the process returns to step S102 to repeat the process of steps S102 to S112 until it is judged that the color tone adjusting operation has been completed.

In the electronic camera 20 of the present invention as described above, the operator can adjust the color tone as desired while viewing the real-time image shown on the monitor 30. Thus, a desired image can be obtained more easily, and operability can be enhanced.

In the example of the above embodiment, the electronic camera 20 can adjust the color tone of the whole real-time image as desired and also can adjust the color tone in a predetermined area of the real-time image. In such a case, before the process in step S100 of the routine shown in FIG. 3, it is determined whether or not the selection signal from the function selection button 36 and the decision signal from the decision button 38 are read and the one-push white balance is determined as the white balance adjustment mode. When the setting of the one-push white balance is confirmed, points which allow to check the moved amount by operating the direction buttons 40a, 40b, 40c, 40d are shown on the monitor 30. When the operator operates the direction buttons 40a, 40b, 40c, 40d to move the points so to determine the predetermined area (generally, the subject), the correction instruction in step S108 may be given to adjust only the determined area. Thus, the color tone of the desired subject can be adjusted freely. The determination of the area of the color tone adjustment is not limited to be made by the method of setting the area by operating the direction buttons 40a, 40b, 40c, 40d and may be made by any methods. For example, the monitor 30 may have a touch panel whose desired area may be touched by the operator to input settings. The operator may also input settings by selecting an area previously registered in the ROM 54.

In the electronic camera 20 of the present invention, the color tone of the real-time image can be adjusted by operating the direction buttons 40a, 40b, 40c, 40d, even after the white balance has been automatically adjusted by the auto white balance, the preset white balance, or the one-push white balance. Thus, fine adjustment can be made as desired, even when the result by the automatic adjustment of the white balance is not satisfactory.

As a method of adjusting the color tone, in the electronic camera 20 of the present invention, the RGB signals forming the image signal may be converted into luminance and two color-difference elements, and the four direction buttons 40*a*, 40*b*, 40*c*, 40*d* may be allocated to respective color-difference elements so that the color tone of the real-time image can be adjusted by operating the direction buttons 40*a*, 40*b*, 40*c*, 40*d*. The color tone may also be adjusted by allocating the direction buttons to the respective elements of the RGB signals as the image signal and operating the direction buttons. When the image signal is indicated by any signals other than the RGB signals, the direction buttons may be allocated accordingly.

The electronic camera 20 of the present invention may include a function selection button 36 for selecting the white balance adjusting mode and for switching to the color tone adjusting mode. Such use is not limitative and the function selection button 36 can also be used for selecting other functions.

While there has been described that what is at present considered to be a preferred embodiment of the invention, it is to be understood that various modifications may be made thereto, and it is intended that the appended claims cover all such modifications as fall within the true spirit and scope of the invention.

Parts list

FIG. 1
22 lens
24 CCD
26 White balance adjusting circuit
28 Signal processing circuit
30 Monitor
32 shutter button
34 CCD driver
50 Controller
52 CPU
54 ROM
56 RAM
 FIG. 2
20 electronic camera
30 monitor

36 selection button
38 decision button
40*a–d* direction buttons
 FIG. 3
Color tone adjusting routine
Outputs a guide to the monitor.
Reads an operation signal.
Is any direction button operated?
Calculates an adjustment value of color tone.
Instructs to correct the color tone.
Reads a decision signal.
Is operation of the direction buttons completed?

What is claimed is:

1. An electronic camera which is portable and has a display device for showing a photoelectric-converted image, said camera comprising:

input means for entering a color tone adjustment value of a real-time image shown on the display device;

adjustment means for adjusting the color tone of the real-time image according to the entered adjustment value; and correction means for correcting the real-time image according to the adjusted color tone.

2. The electronic camera according to claim 1, further comprising:

white balance adjustment means for automatically adjusting a white balance of the real-time image, wherein the input means are means for entering a color tone adjustment value of the real-time image adjusted by the white balance adjustment means.

3. The electronic camera according to claim 1, further comprising:

area setting means for setting at least a partial area of the real-time image shown on the display device, wherein the adjustment means are means for adjusting a color tone in the area set by the area setting means.

* * * * *